Patented Oct. 27, 1931

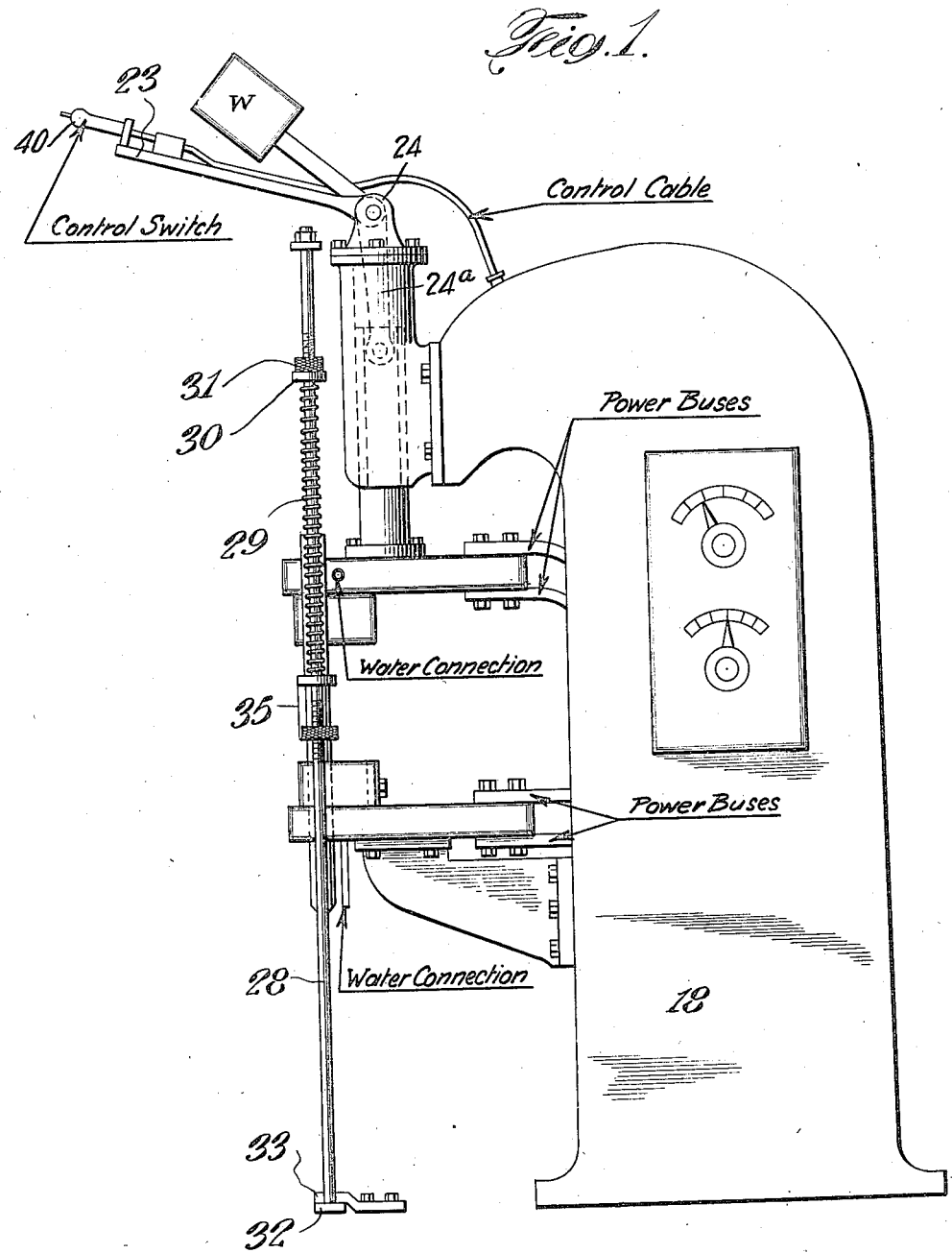

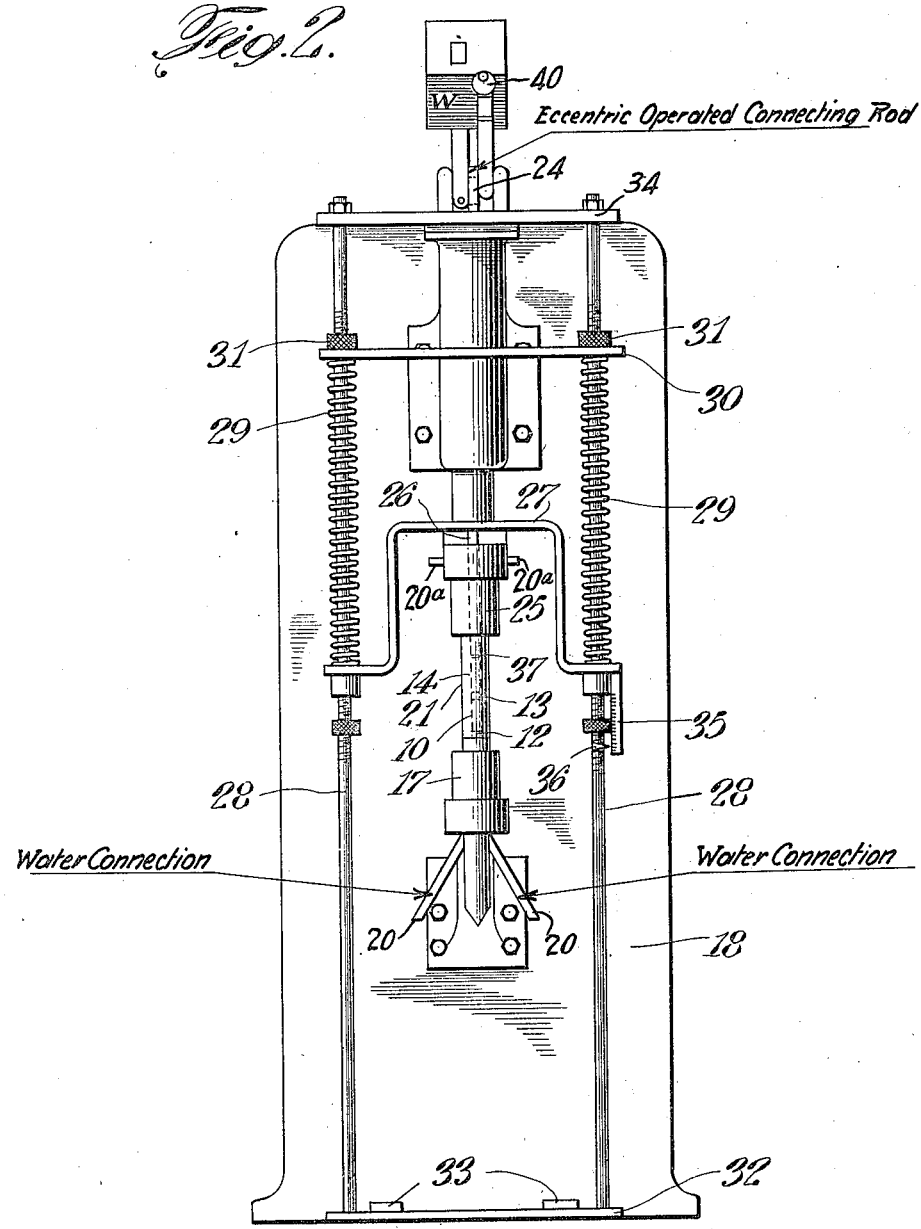

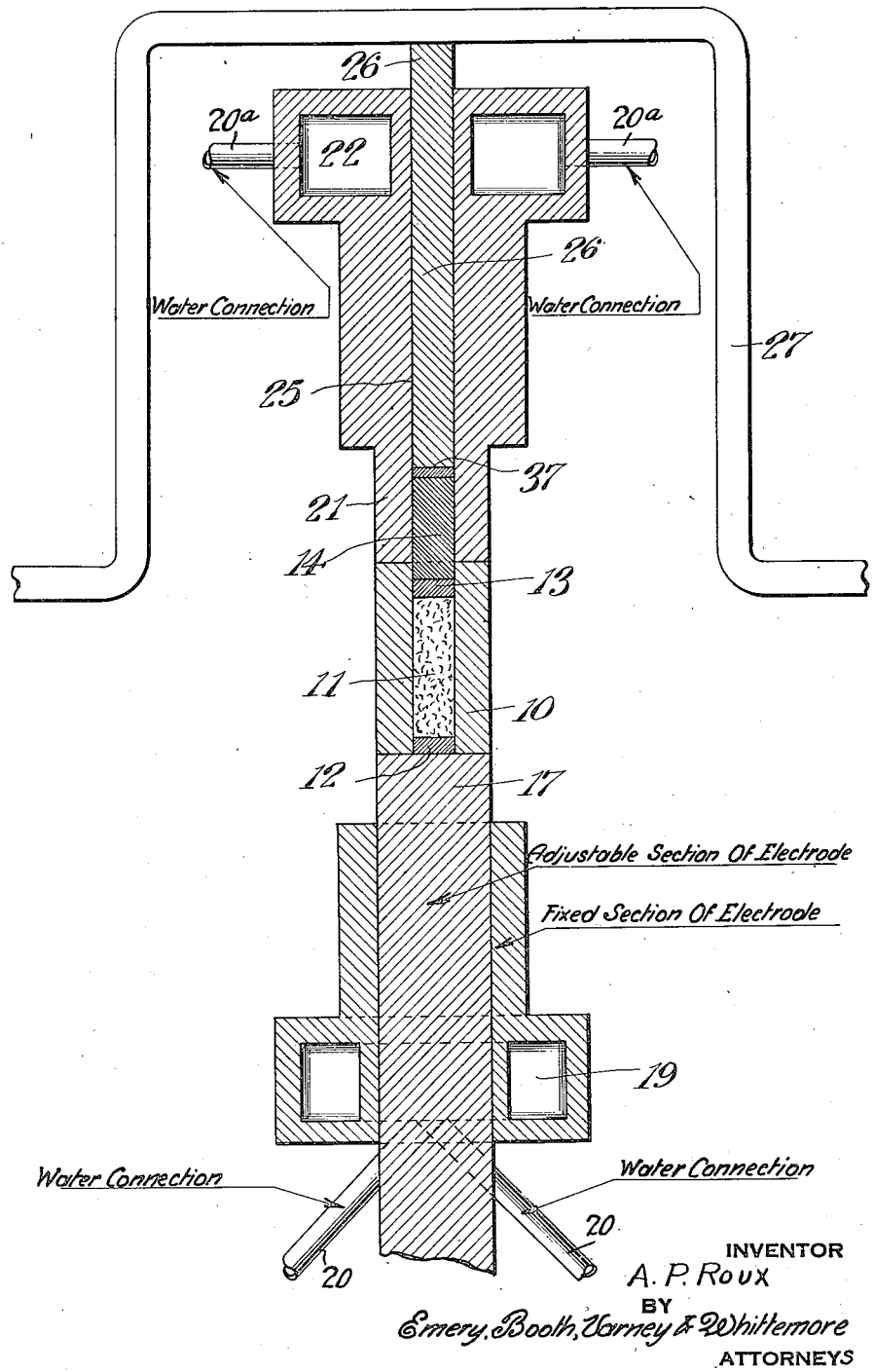

1,829,158

UNITED STATES PATENT OFFICE

ADRIAN P. ROUX, OF ORISKANY, NEW YORK, ASSIGNOR TO GENERAL CABLE CORPORATION, OF NEW YORK, N. Y., A CORPORATION OF NEW JERSEY

METALLURGICAL APPARATUS

Application filed June 28, 1929. Serial No. 374,428.

This invention relates to metallurgical apparatus and has for an object the provision of improved apparatus for carrying out sintering operations by electric heating devices.

In certain sintering operations it has been found advantageous to apply or maintain a pressure upon the material being acted upon. For example, it has been found that in sintering various metals together to form an alloy, a much more compact, coherent and generally superior product can be obtained by maintaining pressure upon the materials in a mold while subjected to the heating effect of an electric current. There are critical limits to this pressure so it is desirable to provide apparatus which will accurately maintain these pressures.

In many sintering operations considerable shrinkage occurs so it is desirable to provide apparatus which will follow up this shrinkage while steadily maintaining the required critical pressure. Moreover, there are critical limits to the time the current should pass and these limits are closely related to the shrinkage of the material. For this reason it is desirable to be able to observe the progress of the shrinkage.

The apparatus hereby provided meets the above requirements and in addition is light in weight, easily manipulated, sturdy in construction and inexpensive to produce.

The invention will be explained by reference to a specific embodiment illustrated in the accompanying drawings in which:

Figure 1 is a side elevation of apparatus embodying the present invention;

Figure 2 is a front elevation; and

Figure 3 is an enlarged vertical section through a mold and related parts.

In order to furnish a better understanding of the background of the present invention it may be observed that it has been developed in connection with the preparation of tungsten alloys such as an alloy of tungsten carbide and cobalt or a related metal, more specifically where such an alloy is formed and simultaneously molded into die blanks. This is an alloy which has been found to require pressure throughout the entire period of its formation, the amount and duration of such pressure materially affecting the quality of the alloy produced.

The apparatus may to advantage be described in connection with the preparation of the alloy of tungsten carbide and cobalt just referred to.

The mixture of powdered tungsten carbide and powdered cobalt is placed (Figure 3) in a carbon mold 10 having for this purpose a central receiving bore 11 closed at the bottom end by a carbon plug 12. Above the mixture in the bore 11 a second carbon plug 13 is inserted and firmly pressed down by hand to compress the powder in the mold. Above the plug 13 a carbon plunger 14 is placed, the plunger protruding well above the upper end of the cylindrical mold.

The mold assembly is placed on the adjustable lower electrode 17 of an electric welding machine 18, care being taken to obtain good electrical contact between the mold and electrode. The electrode 17 is water cooled, there being circulating passages 19 and water connections 20 for this purpose.

The upper end of the mold is engaged by a movable upper electrode 21 also provided with means for cooling comprising the circulating passages 22 and water connections 20a. The upper electrode may be urged down upon the mold to establish good electrical contact (Figure 1) by a lever 23 and an associated weight W the movement being effected through a cam 24 and associated connecting rod 24a.

Pressure upon the powdered mixture which is to form the die blank in the mold is applied by the carbon plunger 14 which extends into the bore 25 of the upper electrode 21. Pressure upon the carbon plunger in turn is applied by a rod 26 fitting within the electrode bore 25 and resting upon the upper end of the carbon plunger. If desired an insulating plate of mica may be placed between the plunger and rod.

The upper end of the rod 26 protrudes above the top surface of the electrode and upon the upper end of the rod there rests a pressure bar 27 which at either end is guided by vertical tension rods 28 and is pressed downward by coil springs 29. The upper ends of the springs are resisted by an adjustment bar 30 and adjustment nuts 31, the bar being slidably mounted on the rods and the nuts being threaded thereon.

The lower ends of the rods 28 are secured to an anchor bar 32 insertable by horizontal movement beneath the anchor plates 33 fastened to the floor or such other base as may be provided for the machine. The upper ends of the rods may be held by a spacer bar 34 placed upon shouldered ends of the rods and held thereon by suitable nuts. The assembly of the pressure bar 27, tension rods 28, adjustment bar 30, anchor bar 32 and spacer bar 34, in effect constitutes a unitary frame which may be readily placed in working position or removed.

A scale 35 on the movable pressure bar 27 in cooperation with a pointer 36 on some fixed part such as one of the tension rods 28 serves to indicate the amount of shrinkage of the blank during sintering.

In operation after the mold assembly has been placed between the electrodes and the upper electrode brought down upon the mold, the rod 26 is placed in the bore 11 upon the carbon plunger 14 and the pressure frame brought into position with the pressure bar 27 resting upon the head of the rod 26. By standing upon the mid-portion of the anchor bar 32 the operator is able to bring the ends of the anchor bar to the floor whereupon by moving them horizontally he engages them beneath the anchor plates 33.

After assembling the parts in the welding machine the current is turned on by actuating a timing or control switch 40 placed for convenience on the handle 23 and the powdered mixture sintered to form the die blank. During sintering the scale on the pressure bar will take several successive drops relative to the pointer. After the final drop, which may be readily observed by the operator, the current is allowed to remain on for a short time and then turned off by the switch 40. Preferably, the pressure is not relieved at this time but allowed to remain on until the blank has fully cooled. This is a convenient way to cool the mold since the electrodes are water cooled.

After the mold has cooled the pressure frame is taken off and the mold removed. The die blank is extracted from the mold by driving the carbon plugs and the blank out of the bore of the mold with a punch. After removal of the blank and separation of the carbon plugs from its ends, it may be pierced by diamond tools in the usual manner of making dies of very hard material.

Dies made in this way have been placed in service for drawing copper wire and have been found to give uniformly high results. For example, runs of 5,000,000 to 17,000,000 feet, and an average from many runs of about 6,000,000 feet have been made, whereas the best results which have been obtained from dies of other alloys were from 600,000 to 4,000,000 feet of the same size wire.

It will be seen therefore, that the present apparatus materially contributes to the production of improved alloys which for dies at least have given a higher maximum service and a much higher average length of service than any heretofore produced and insure consistent duplication of good results, a matter which has heretofore been difficult of attainment.

While one embodiment of the invention has been described in detail it is to be understood that various modifications are possible within the scope of the invention as set forth in the appended claims.

What I claim is:

1. Apparatus for sintering metal alloys comprising in combination, spaced electrodes having disposed therebetween a mold containing the material to be sintered, a plunger resting upon the material in the mold, and means to apply pressure on said plunger including a pressure bar resting on said plunger, guide rods providing slidable movement of said pressure bar therealong, springs on said rods acting upon said pressure bar, means on said rods for adjusting said springs, an anchor bar fixed to the lower ends of said rods, anchor plates beneath which said anchor bar may be moved to bring said pressure bar down upon said plunger, and means for measuring the drop of said pressure bar including a scale and cooperating pointer, one of which is disposed on the pressure bar and the other on a fixed part.

2. Apparatus for sintering metal alloys comprising in combination, spaced electrodes having disposed therebetween a mold containing the material to be sintered, a plunger resting upon the material in the mold, and means to apply pressure on said plunger including a pressure bar resting on said plunger, guide rods providing slidable movement of said pressure bar therealong, springs on said rods acting upon said presusre bar, means on said rods for adjusting said springs, an anchor bar fixed to the lower ends of said rods, and anchor plates beneath which said anchor bar may be moved to bring said pressure bar down upon said plunger.

3. Apparatus for sintering metal alloys comprising in combination, spaced electrodes having disposed therebetween a mold containing the material to be sintered, a plunger resting upon the material in the mold, and means to apply pressure on said plunger including a unitary pressure frame including tie rods and cross bars, one of which bars is spring pressed and the other of which is removably secured to a fixed anchor.

4. Apparatus for sintering metal alloys comprising in combination, spaced electrodes having disposed therebetween a mold containing the material to be sintered, a plunger resting upon the material in the mold, and means to apply pressure on said plunger including a unitary pressure frame and means to measure the shrinkage of said material.

5. Apparatus of the character described comprising, means to impose a sintering heat upon a confined body of material, and means including a spring to impose pressure upon the body of material, means to adjust the tension on said spring to vary the pressure.

6. Apparatus of the character described comprising, a pair of electrodes confining therebetween a mold containing a body of material to be sintered, and means extending through one of said electrodes and into the mold to apply pressure upon the material therein.

7. Apparatus of the character described comprising in combination, a mold for confining a body of material, means to heat the material to sinter it, and means for applying pressure to the material within said mold including a contact member, a spring guide, a spring, and means to adjust said spring.

8. Apparatus of the character described comprising in combination, a mold, separable electrodes engageable therewith, means for pressing the electrodes upon said mold, and means to exert independent pressure upon material within said mold.

In testimony whereof, I have signed my name to this specification this 18th day of June 1929.

ADRIAN P. ROUX.